United States Patent [19]

Keyworth, II et al.

[11] Patent Number: 5,579,472
[45] Date of Patent: Nov. 26, 1996

[54] GROUP-ORIENTED COMMUNICATIONS USER INTERFACE

[75] Inventors: George A. Keyworth, II, Santa Fe, N.M.; Baldev Krishan; Kalyan V. Krishnan, both of Fremont, Calif.

[73] Assignee: Novalink Technologies, Inc., Fremont, Calif.

[21] Appl. No.: 337,100

[22] Filed: Nov. 9, 1994

[51] Int. Cl.⁶ .................................................. G06F 3/14
[52] U.S. Cl. ............................................................ 395/326
[58] Field of Search ................................. 395/160, 161, 395/490, 650, 700, 155, 156, 157, 158, 159, 600

[56] References Cited

U.S. PATENT DOCUMENTS 5,335,346  8/1994  Fabbio ................................ 395/490
5,339,392  8/1994  Risberg et al. ..................... 395/161
5,481,715  1/1996  Hamilton et al. .................. 395/700

*Primary Examiner*—Raymond J. Bayerl
*Assistant Examiner*—Ruay Lian Ho
*Attorney, Agent, or Firm*—Nicola A. Pisano; Fish & Neave

[57] ABSTRACT

A system and methods are provided for displaying and processing communications via a variety of communications media using a personal computer. Messages received either wirelessly, for example, wireless e-mail, or over telephone wireline, such as voice mail or facsimile, are segregated and presented for review by the subscriber according to whether the originator is within a select group of routinely contacted individuals and also by type of media. The system includes a graphical user interface to provide an intuitive and efficient message processing capability. In alternative embodiments the apparatus and methods are self-documenting and facilitate communication to the system manufacturer.

30 Claims, 17 Drawing Sheets

| Type | # | From | Time and Date | Length | Status |
|---|---|---|---|---|---|
| 📠 | 1 | Julia | 7/12/94 9:22:00 AM | 1 mins 11 secs | OK |
| 📠 | 2 | Dr. Mandelbrat | 7/11/94 5:04:00 PM | 25 secs | OK |
| 📠 | 3 | The Doc's Fax | 7/4/94 10:00:00 AM | 2 pages | OK |
| 📠 | 4 | Presidential Fax Machine—Bill's Fax | 7/3/94 2:00:00 PM | 2 pages | OK |
| ✉ | 5 | Julia Child | 7/1/94 8:00:00 PM | 35 characters | OK |
| ✉ | 6 | Dr. Mandelbrat | 6/30/94 6:45:00 PM | 30 characters | OK |

111 — 6 New Messages

110

112 — Hello from Julia

Exit

FIG. 10

GROUP-ORIENTED COMMUNICATIONS USER INTERFACE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to methods and apparatus for computer-based communications systems that enhance and simplify a subscriber's interactions with a variety of communications media. The present invention has particular application for subscribers who communicate with a select group of individuals on an ongoing basis, by enabling the subscriber to specify a preferred group of individuals for simplified communications interactions.

In previously known information messaging systems, it is typical for the communications to be stored in a "mailbox," i.e., a data storage location, chronologically in the sequence in which the messages are received. For example, in voice mail systems, the recipient is typically notified when he or she logs onto the voice mail system that a number of voice messages have arrived. The user then progresses through the messages in a serial manner, and typically has little information concerning the origin of any particular message until playback of that message has begun.

Likewise, in e-mail systems, received messages are kept in an incoming message queue, while outgoing messages are stored in a second separate queue. As in voice mail, an e-mail subscriber can determine which messages have been received from or sent to a particular sender or addressee only by examining the header information for all of the messages in the incoming or outgoing queue.

While the above-noted drawbacks associated with previously known voice mail systems and e-mail systems are not insurmountable for a subscriber who only occasionally uses such systems for communicating with others, these methods can become excessively cumbersome for a subscriber who interacts with a select group of individuals, among numerous other individuals, on a routine basis.

It would therefore be desirable to provide a system and method having a communications user interface that displays queue and message information particular not only to a specific communications medium, but that actually segregates and displays the information for individual members within a select group.

It also would be desirable to provide a system and method having a communications user interface and methods for use on personal computers for processing communications received over a variety of media in an efficient, ergonomic and intuitive manner.

It further would be desirable to provide a communications user interface for use on personal computers that enables a subscriber to interact with a variety of communications media, including for example, wireline (facsimile and modem) communications and wireless communications (pager and wireless e-mail).

It still further would be desirable to provide a communications user interface for use on personal computers that provides the ability to designate communications to and from a select group of individuals (from among a larger group of individuals) for special treatment, including the display of directional indication and status indicators for those communications.

It would also be desirable to provide enhancements to a communications user interface as suggested above to make the interface intuitive and user-friendly, for example, such as by providing a self-documenting feature and a feature that enables streamlined communication with the interface manufacturer.

SUMMARY OF THE INVENTION

In view of the foregoing, it is an object of the present invention to provide a communications user interface system and method that not only displays queue and message information particular to a specific communications medium, but that segregates and displays the information for individual members of a selected group.

It is another object of this system to provide a communications user interface and method for use on personal computers for processing communications received over a variety of media in an efficient, ergonomic and intuitive manner.

It is yet another object of the present invention to provide a communications user interface system and method for use on personal computers that enable a subscriber to interact with a variety of communications media including for example, wireline and wireless communications.

It is a still further object of this invention to provide a communications user interface system and method for use on personal computers that provides the ability to designate communications to and from a select group of individuals for special treatment, including the display of directional indication and status indicators for those communications.

It is still another object of this invention to provide enhancements to a communications user interface as suggested above that make the interface intuitive and user-friendly, including the provision of a self-documenting feature and a feature that enables streamlined communication with the interface manufacturer.

These and other objects of the invention are accomplished in accordance with the principles of the invention by providing a communications user interface system and methods of displaying a gallery of icons, with each icon representative of a member of a select group of individuals. Each icon representative of a member of the select group is associated with directional icons showing the number of messages received from or sent to that member of the group. The current status of these messages (for example, whether successfully or delivered or played back) is also displayed.

In accordance with the present invention, the gallery displayed by a subscriber may be particular to that subscriber and may be individually configured by that subscriber. For example, if a subscriber routinely communicates by fax, e-mail or voice mail with a small group of colleagues or co-workers, the subscriber may choose to designate those colleagues or co-workers as members of a "VIP gallery" on his or her computer display. Communications to or from members of that group are then separately displayed in a portion of the main screen display, so that the subscriber is provided with the real-time status of communications with members of the group on a real-time basis.

Further features of the invention, its nature and various advantages will be more apparent from the accompanying drawings and the following detailed description of the preferred embodiments.

BRIEF DESCRIPTION OF THE DRAWINGS

FIGS. 10–14 are exemplary displays, produced by the system of the present invention, for accessing all communications received by the subscriber, whether or not the originator was selected for inclusion in the VIP gallery;

DETAILED DESCRIPTION OF THE PREFERRED EMBODIMENTS

Figure 1:
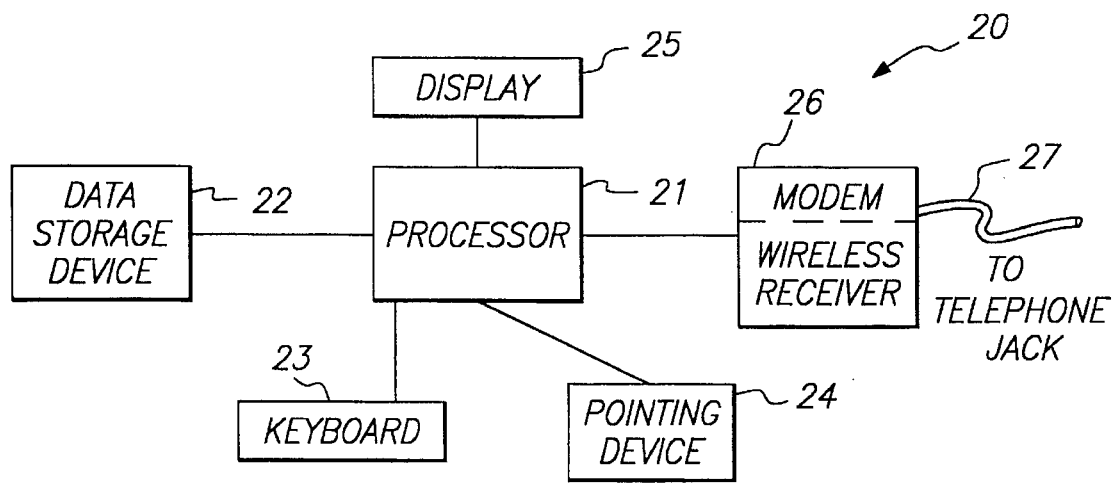
FIG. 1 illustrates a block diagram of an exemplary apparatus suitable for implementing the methods of the present invention.

Referring to FIG. 1, exemplary apparatus 20 suitable for use in implementing the present invention and methods is described. Apparatus 20 includes main processor 21 and data storage device 22, and may comprise a personal computer, either portable or desktop, or a personal digital assistant such as the Newton™ made by Apple Computers, Cupertino, Calif. Apparatus 20 further includes keyboard 23, pointing device 24 (e.g., mouse or track ball) and display screen 25. As is conventional, pointing device 24 has means for positioning the cursor of display 25, and one or more command keys for operating upon icons targeted by the cursor.

Communications device 26, which may be, for example, a modem, external facsimile card, or telephone line interface, is coupled to computer 20 through a communications port, such as an RS232 port or PCMCIA port. Communications device 26, which may also comprise a combination fax/modem and wireless receiver as described in copending and commonly assigned U.S. patent application Ser. No. 08/174,797, filed Dec. 29, 1993, connects to telephone line 27 using a conventional connector.

Data storage unit 22 (e.g., a hard disk drive) stores software that enables main processor 21 to send and receive facsimile messages and e-mail messages, and optionally, to serve as a digital telephone answering machine, as explained herein below. If communications device 26 comprises a combination fax/modem and wireless receiver as described in the above-mentioned application, then data storage unit 22 may also store software that enables main processor 21 to receive wireless pager or e-mail messages. For the purposes of explaining the present invention, computer 20 operates using a DOS operating environment and software such as Windows Version 3.1 or higher, available from Microsoft Corporation, Redmond, Wash.

In accordance with the present invention, data storage unit 22 includes software that enables the computer user, hereinafter referred to as the subscriber, to designate a select group of individuals from among those with whom he or she routinely communicates, for inclusion in a "VIP gallery." Individuals selected for inclusion in the VIP gallery will have communications to and from the subscriber handled in a preferred manner, as described below. The present invention may be implemented in apparatus 20 using Visual Basic or C++ programming languages, as is conventional for Windows-based graphical interfaces, and as would be readily understood by one skilled in the art of Windows-based programming.

Figure 2:
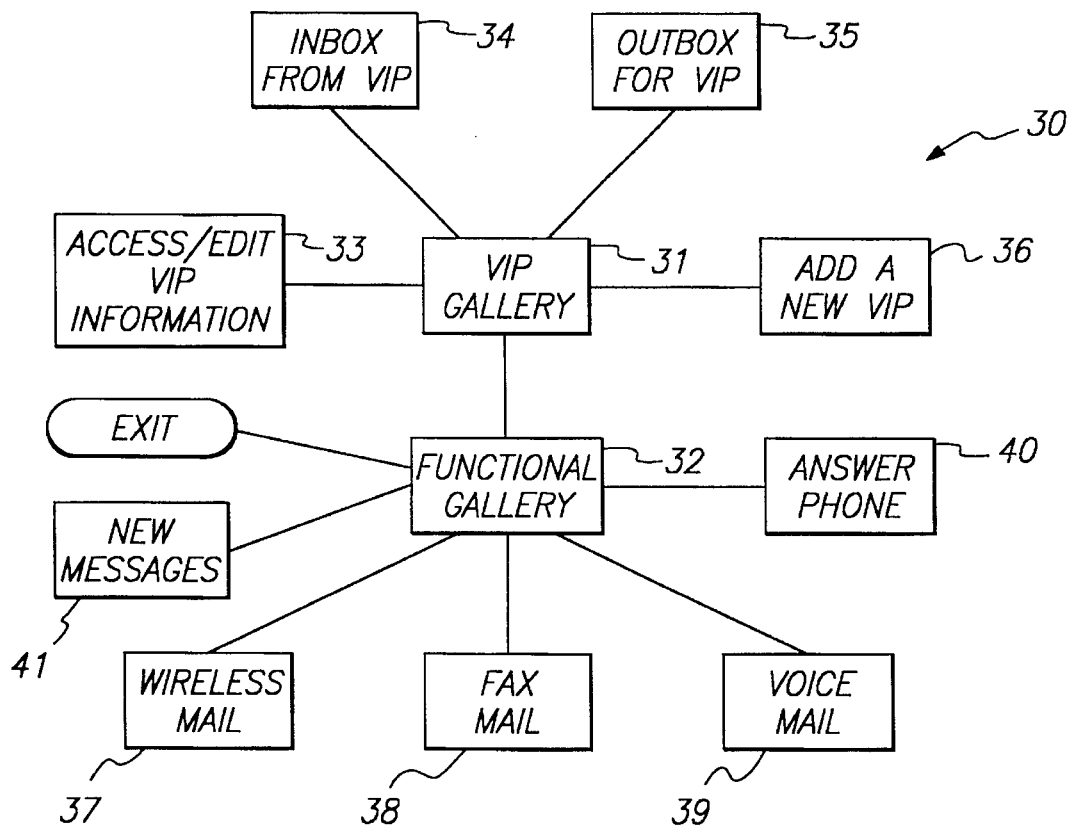
FIG. 2 is a diagram showing illustrative interrelations of the user interface displays employed in the system of the present invention.

Referring now to FIG. 2, illustrative diagram 30 showing the functional interrelation of the displays employed in accordance with the present invention are described. The basic components of the system are described with respect to FIGS. 2 and 3, and the operation of the system is then described in greater detail below in conjunction with the individual functional blocks of FIG. 2.

Figure 3:
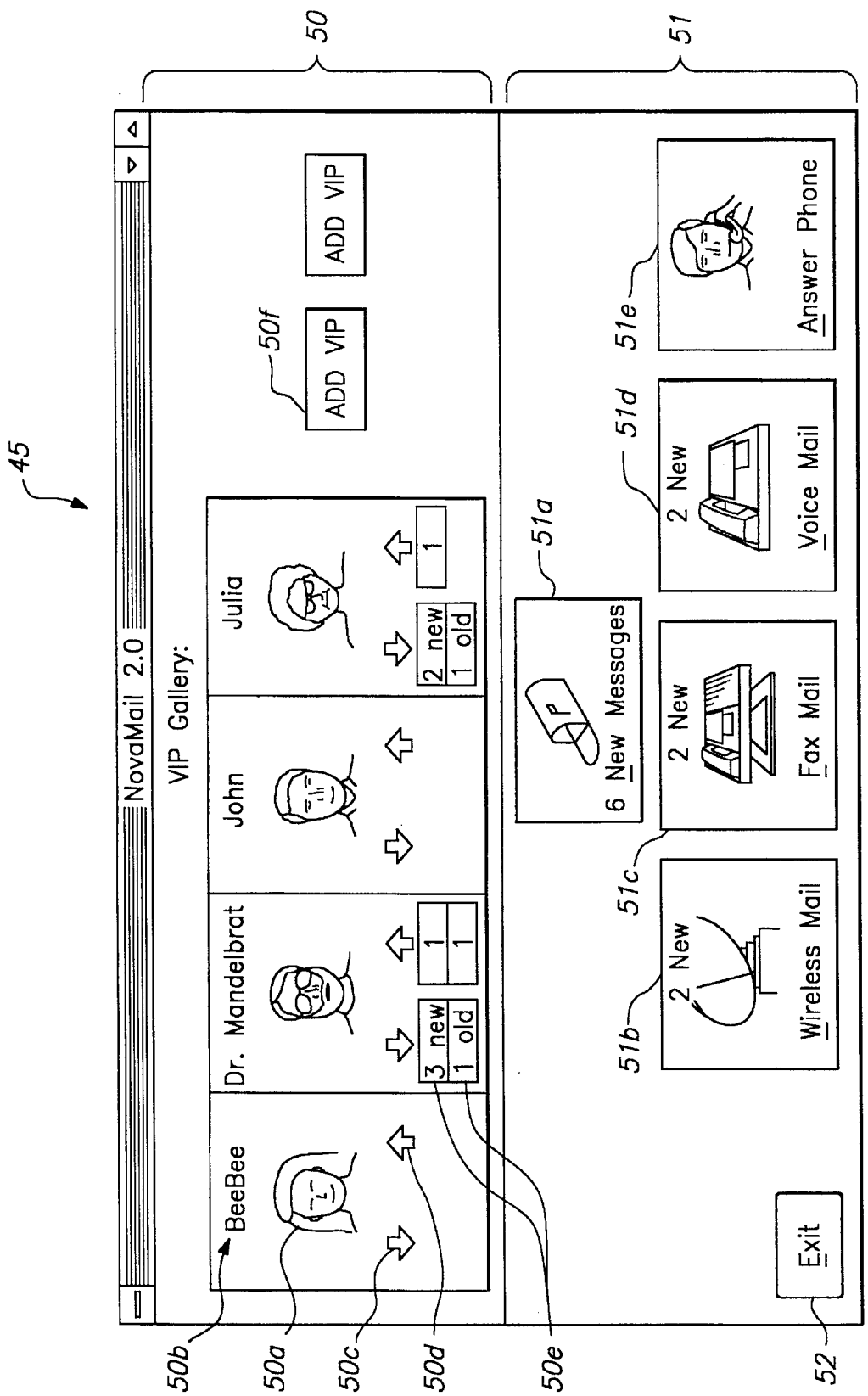
FIG. 3 is an illustrative main display produced by a system in accordance with the present invention.

Central to the apparatus and methods of the present invention is VIP gallery, block 31. As shown in FIG. 3, the information contained in VIP gallery block 31 is presented in upper portion 50 of main display 45. VIP gallery includes in this illustrative embodiment six individuals, with each individual member of the VIP gallery having a specific image 50a representative of that person and associated title 50b. In one preferred embodiment, the image may include a digitized likeness of that individual's face.

As shown in portion 50 of FIG. 3, each member of the VIP gallery also has associated with it two directional icons, represented in the preferred embodiment by downward facing arrow 50c and upward facing arrow 50d. Directional icons 50c, 50d may include one or more status indicator boxes 50e. Messages sent by, or received by, the subscriber are stored in data storage device 22 and are monitored by processor 21. Status indicator boxes 50e are updated from time to time, as appropriate, by processor 21 to alert the subscriber concerning the current status of messages of the type represented by that directional icon.

In the preferred implementation of the present invention, the display for indicator boxes 50e employs color coding to alert the subscriber, at a glance, of the current status of incoming and outgoing messages. Thus, for example, the number of new incoming messages from a given member of the VIP gallery may be displayed before the word "NEW" in a box having a pink background under the incoming directional icon, while the number of old messages from that person might appear before the word "OLD" in a box having a light blue background. The number of messages successfully sent to that person may appear in a box having a green background, while the number of those unsuccessfully sent might be displayed in a box having a red background. Also, pending messages to be sent to a member of the VIP gallery may be displayed in a box having a yellow background.

Functional gallery, shown as block 32 in diagram 30 of FIG. 2, comprises the informational display shown as lower portion 51 of display 45 of FIG. 3, and may include images representative of the various communications modes that can be accessed via the present invention. As shown in FIG. 3, functional gallery 51 includes a new message box 51a that displays the total number of new messages received by the subscriber's system, including the new messages otherwise indicated in the VIP gallery. Functional gallery 51 also displays image boxes 51b, 51c, and 51d representative of various modes of communication. For example, an antenna represents wireless communications in box 51b, a facsimile machine represents facsimile communications in box 51c, and a telephone represents voice mail in box 51d. The number of each type of new messages is displayed before the word "NEW" in the image boxes 51b–51d for each of the communications modes.

Still referring to FIG. 3, functional gallery 51 also includes display box 51e, entitled ANSWER PHONE, which enables the subscriber to put the system into a telephone answering/voice mail mode of operation. In telephone answering/voice mail mode, processor 21 and data storage device 22, in conjunction with communications device 26 (for example, as described in the above-mentioned U.S. application Ser. No. 08/174,797), answers an incoming call, plays out a prerecorded greeting to the caller, and records a message from the caller. In addition, EXIT box 52 provides for exiting the implementation of the present invention, for example, to return to Windows, DOS, or another program operating on apparatus 20.

Referring again to FIG. 3, diagram 45 illustrates the other functions and displays that may be accessed through VIP gallery 50 and functional gallery 51 in accordance with aspects of the present invention. In the described implementation of the present invention, processor 21 is commanded to execute programmed instructions stored in data storage device 22 in response to inputs received from pointing device 24. Those inputs comprise signals generated by pointing device 24 while operating upon icons and command boxes in VIP gallery 50, as is well known to those skilled in the art of Windows-based computer programming.

From VIP gallery 31, a subscriber may access the functions of: display 33 for editing communications parameters for a member of the VIP gallery; display 34 for reading or listening to messages from a member of the VIP gallery; display 35 for reading or listening to messages sent to a member of the VIP gallery; and display 36 for adding a member to the VIP gallery.

For example, with reference to FIG. 3, the subscriber may move from main display 45 by operating the pointing device upon the icon for a selected member of the VIP gallery. Processor 21 in response executes programmed instructions stored in data storage device 22 to cause display of block 34, "Inbox From VIP," thereby making the information and functions pertaining to that display available to the subscriber.

Likewise, as shown in diagram 45 of FIG. 2, the subscriber may access through functional gallery 32 the functions of: display 37 for reading wireless messages; display 38 for reading or otherwise disposing of facsimile messages (referred to as "Fax Mail"); display 39 for listening to voice mail messages; command box 40 for activating the telephone answering/voice mail mode of system operation; and display 41 for reviewing new messages.

Operation of the features of VIP gallery 50 of the present invention are described with reference to FIGS. 4–9 in conjunction with FIGS. 2 and 3. A subscriber activates the "ADD VIP" function of VIP gallery 50 by moving the cursor to the box labelled "ADD VIP" (FIG. 3, box 50f) and operating the command key of pointing device 24. Processor 21 interprets this command as a request to load and execute the programmed instructions associated with the "Add A New VIP" display 70, FIG. 4.

Figure 4:
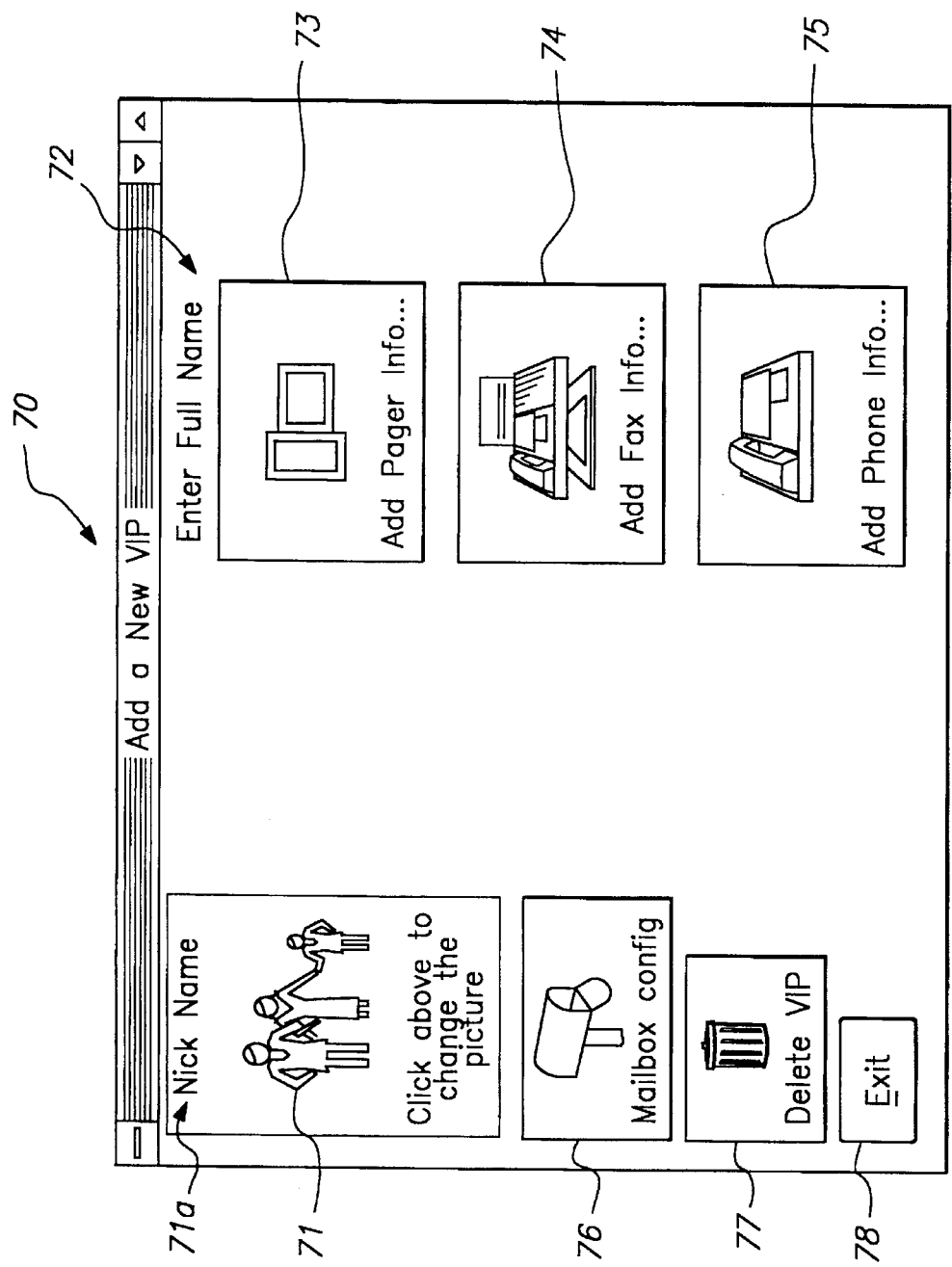
FIG. 4 is an exemplary display, produced by the system of the present invention, for adding a new member to the VIP gallery.

Once display 70 of FIG. 4 is made available to the subscriber, the subscriber moves the cursor to command box 71 and operates the pointing device command key to select an image representative of the intended new member of the VIP gallery from a stored library of facial images. The stored library of facial images or portraits may include, for example, several dozen generic pictures of people of various sex, age, and race. Alternatively, the subscriber may choose to scan in an actual picture of a person to be added to the VIP group, using conventional image scanning software. The subscriber may also append a title or nickname to the image which is displayed along with the selected image in VIP gallery 50 by typing in the name at command line 71a.

Figure 5:
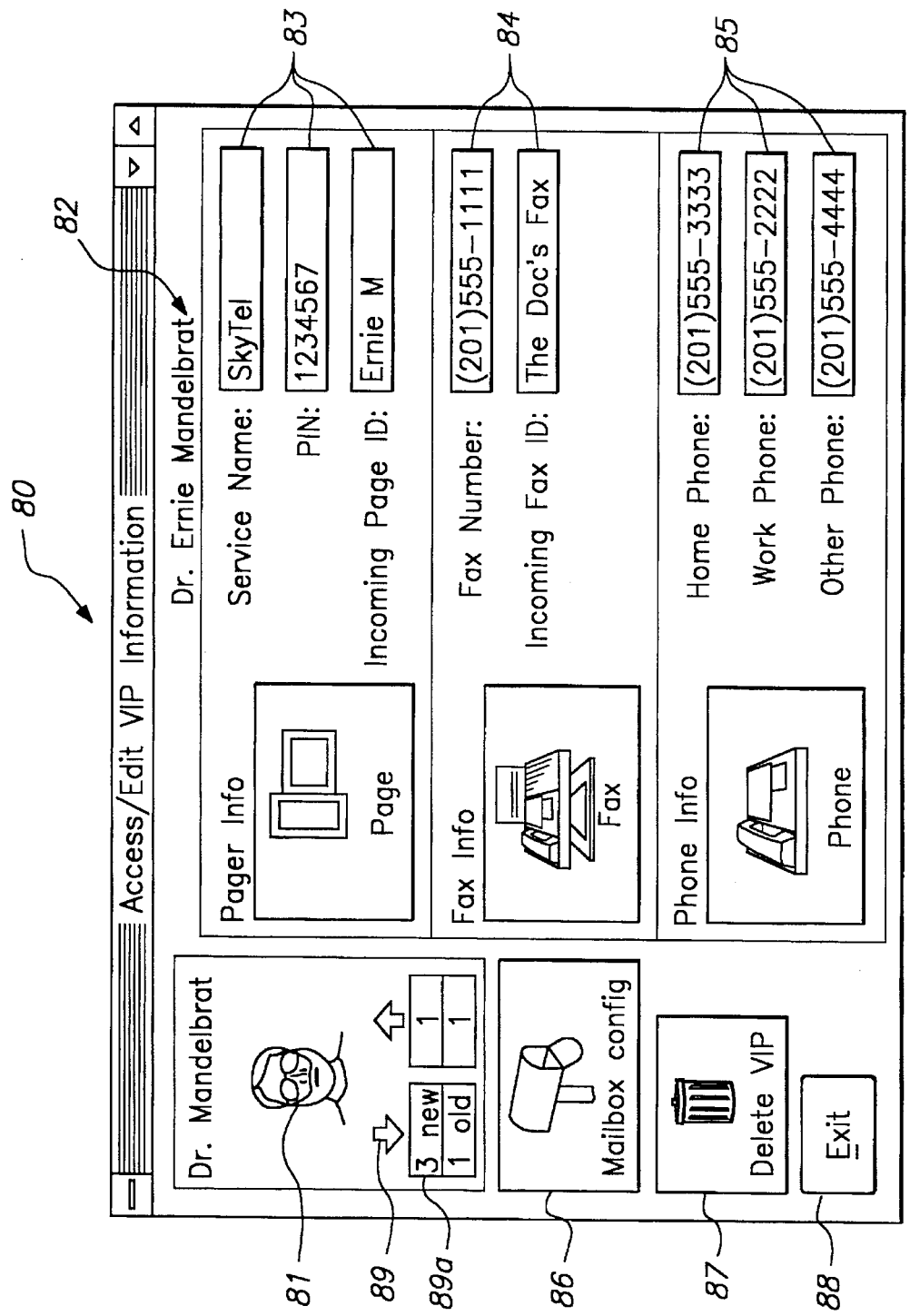
FIG. 5 is an exemplary display, produced by the system of the present invention, for accessing and editing communications parameters for a selected member of the VIP gallery.

While still in Add A New VIP display 70, the subscriber may also enter the VIP member's full name at command line 72. The subscriber may then input the communications parameters for that person's pager, facsimile and telephone by moving the cursor to, and operating upon, command boxes 73, 74, and 75, respectively. When the subscriber actuates the command key of the pointing device while positioned on the command boxes 73–75, a display is obtained such as shown in FIG. 5. While in the display of FIG. 5, processor 21 and data storage device 22 accept entry of telephone numbers, passwords and identification numbers into predefined data entry fields 83–85.

Referring still to FIG. 4, command box 76 enables the subscriber to set up a mailbox (i.e., create a data structure on data storage device 22) in which messages received from the VIP member are deposited and in which the subscriber may record a message or greeting for that VIP member. Thus, for example, MAILBOX CONFIG command box 76 permits the subscriber to set up a specific mailbox for that VIP member, and to specify the configuration of that person's mailbox, for example, maximum disk space to be allocated to that mailbox, message retention limits, passwords, etc.

Moving the cursor to, and operating upon, command box 77, labelled "DELETE VIP," deletes information stored for that member of the VIP gallery and removes the title and image for that person from VIP gallery 50. EXIT command box 78 enables the subscriber to exit display 70 and return to main display 45.

FIG. 5 illustrates the "Access/Edit VIP Information" display 80 that is loaded and displayed by apparatus 20 in response to the subscriber's positioning the computer cursor on, and actuating the pointing device command key upon, image 50a of a VIP member in VIP gallery 50. Display 80 presents the same types of information as display 70, except that the information in command boxes 81, 82, 83, 84 and 85 is already present from having been previously entered via display 70, and permits this information to be edited as desired by the subscriber. This display also provides command boxes 86, 87 and 88 having the same functionality as described hereinabove with respect to FIG. 4. Directional icons 89 and status indicators 89a are also provided in command box 81 to apprise the subscriber of the current status of messages to and from that VIP member.

The subscriber may move to messages from a given member of the VIP gallery by positioning the cursor on, and actuating the pointing device command key upon, the status indicator boxes beneath the directional icons in VIP gallery 50 of main display 45. If the subscriber operates upon the status indicator boxes beneath the downward facing directional icon, processor 21 loads and executes programmed instructions for block 34 of diagram 30, thereby presenting display 90, labelled "Inbox From VIP", described with respect to FIGS. 6–8. If the subscriber operates upon the status boxes located under the upward facing directional icon, processor 21 moves to block 35 of diagram 30 by loading and executing the programmed instructions for display 100, labelled "Outbox For VIP", described with respect to FIG. 9.

Figure 6:
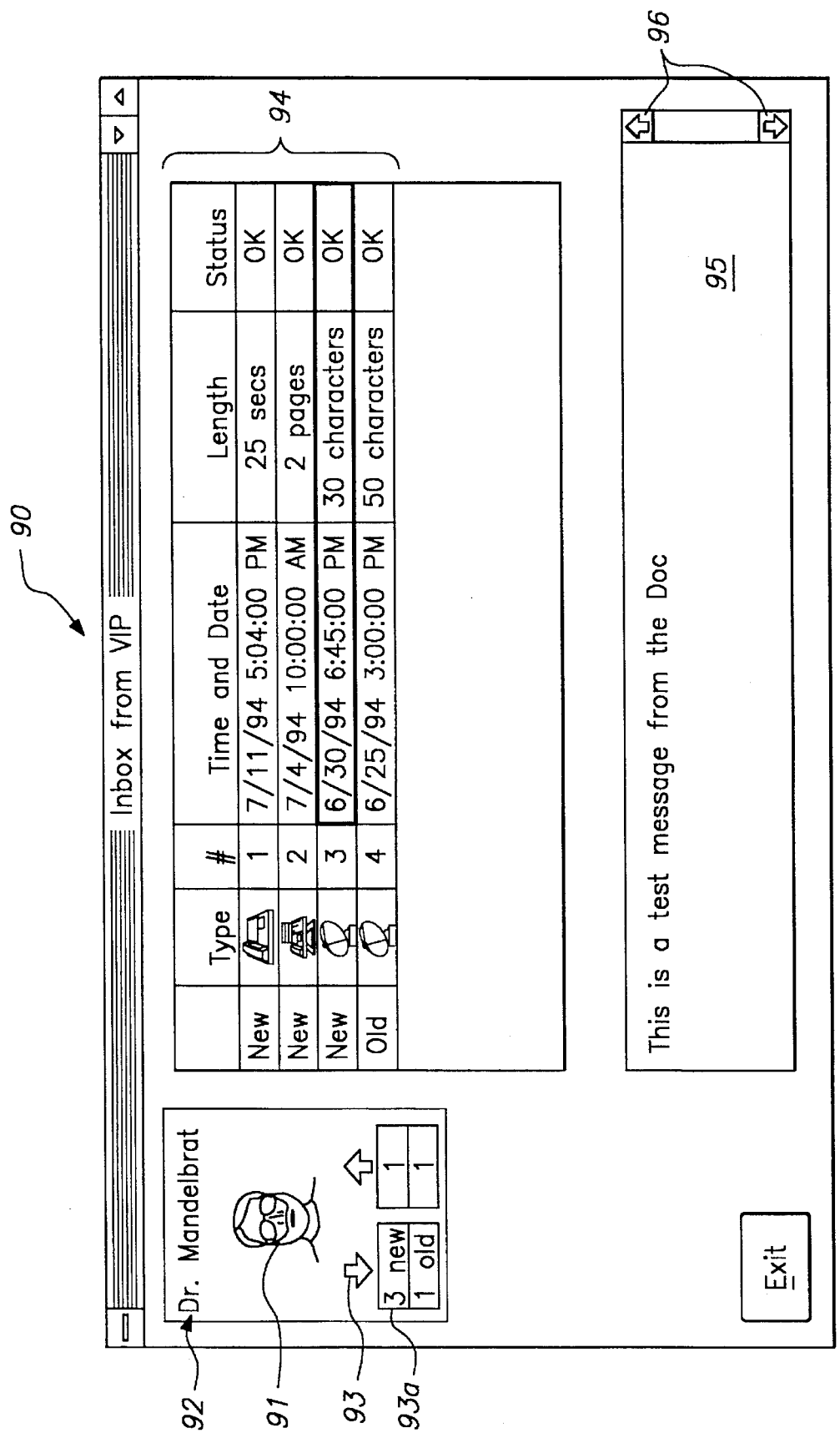
FIGS. 6–9 are exemplary displays, produced by the system of the present invention, for accessing communications to and from members of the VIP gallery via status indicators associated with the directional icons for gallery members.
Figure 7:
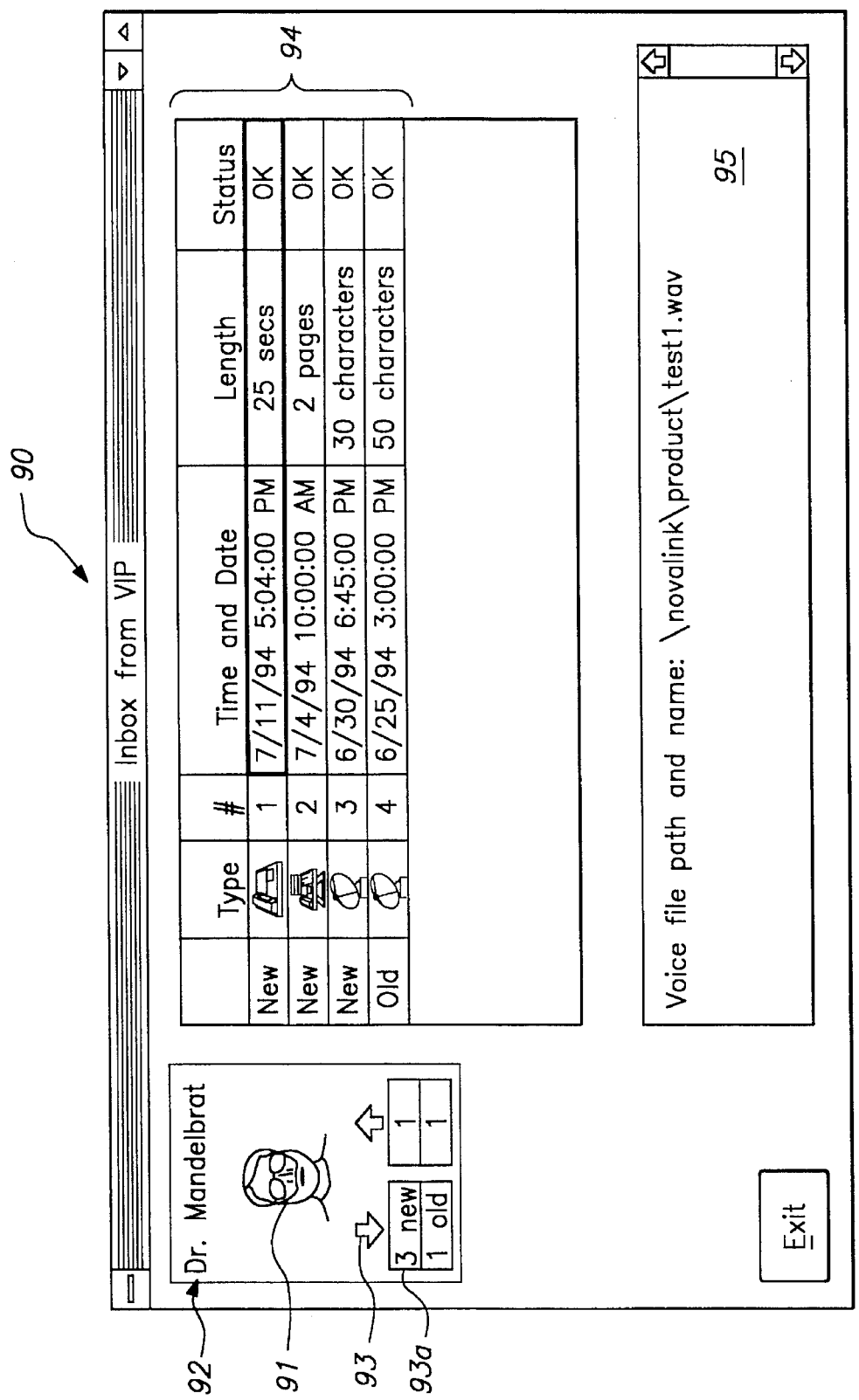
Figure 8:
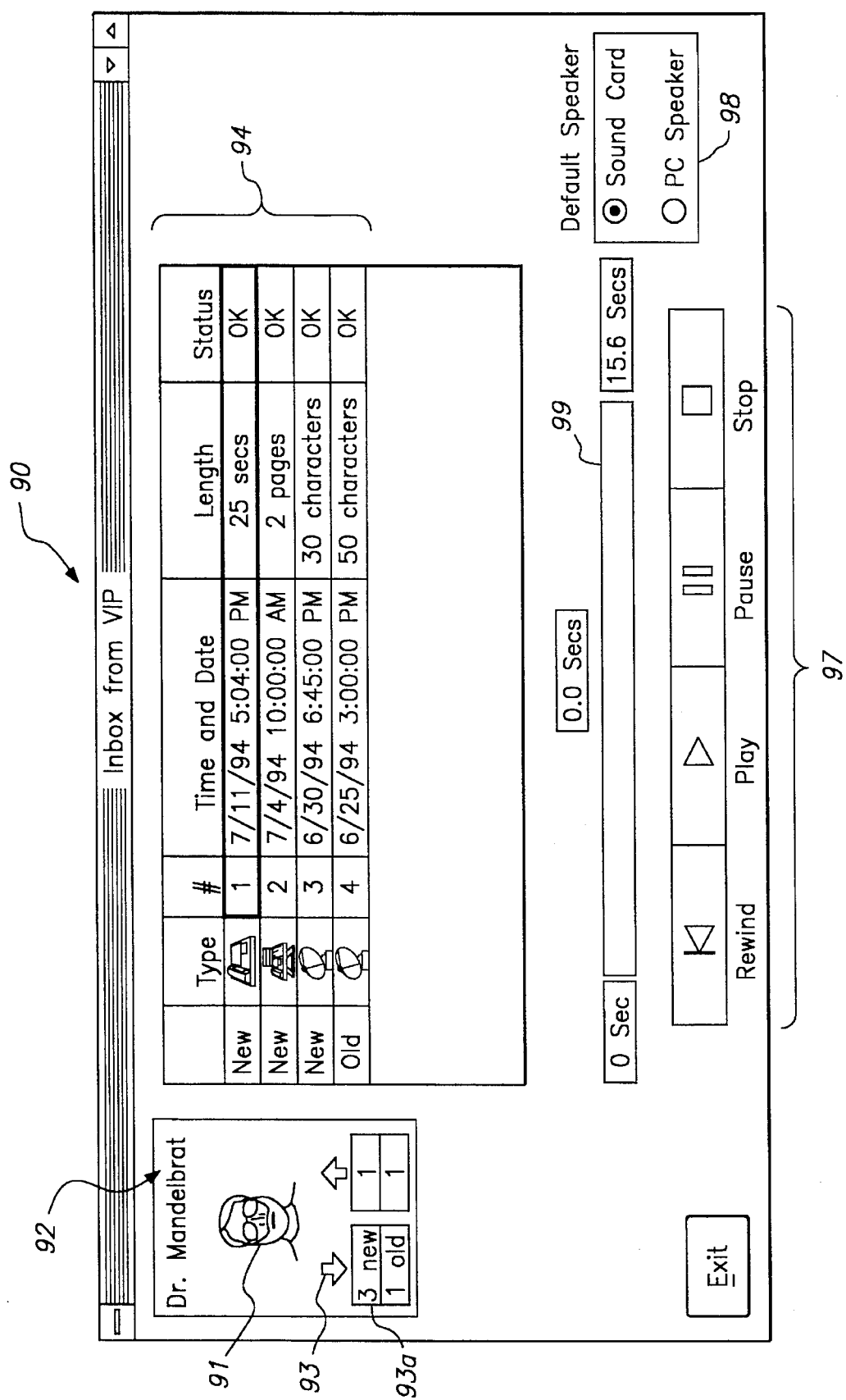

Referring now to FIGS. 6–8, display 90 includes an image of a VIP member 91, his or her associated title or nickname 92, and directional icons 93 and status indicators 93a. Of most utility to the subscriber, display 90 presents queue 94 comprising messages received solely from the VIP member whose image 91 is displayed. Each message is assigned its own line of information fields which include whether the message has previously been read or heard by the subscriber (i.e., OLD) or just received (i.e., NEW); the type of message; the message number in the queue; the date and time of receipt of the message; the length of the message; and the status of the message (i.e., whether it experienced any transmission errors). The type of message is indicated, for example, by display in the type information field of an image of an antenna for a wireless message, a telephone console to represent a voice mail message, and a facsimile machine to represent a facsimile message. Messages preferably are displayed in queue 94 with all new messages in reverse chronological order followed by all old messages in reverse chronological order.

Beneath queue 94 appears information window 95 which displays the text of a message, or the path name of a voice mail file, if that file is selected using pointing device 24 of computer 20. As shown in FIG. 6, if the message is a wireless e-mail message, the contents of the message will be displayed in information window 95 when the cursor is positioned upon and selects that message (shown in reverse video for that entry in queue 94). Controls 96 are provided for scrolling through the text of the message.

As shown in FIG. 7, if the cursor is positioned upon and selects a voice mail message, the voice file path and name are displayed in information window 95. If the pointing device is actuated again while positioned upon the voice mail message, information box 95 is replaced with audio control command boxes 97 and 98, and message duration counter 99, as illustrated in FIG. 8. Audio command boxes 97 enable the subscriber to play, rewind, pause and stop playback of the voice message, while message duration counter 99 provides both analog and digital readouts of the message length and the subscriber's present location in the message.

Command box 98 enables the subscriber to select either a speaker built into apparatus 20, or an optionally added commercially available sound card. For example, recent portable computers manufactured by Compaq Corporation include built-in speakers. Alternatively, external speakers such as the ACS50 sold by Altec Lansing Corporation, Milford, Pa., may be used in conjunction with an add-on sound card, such as the Pro Audio Studio 16 card available from Media Vision, Fremont, Calif.

Figure 9:
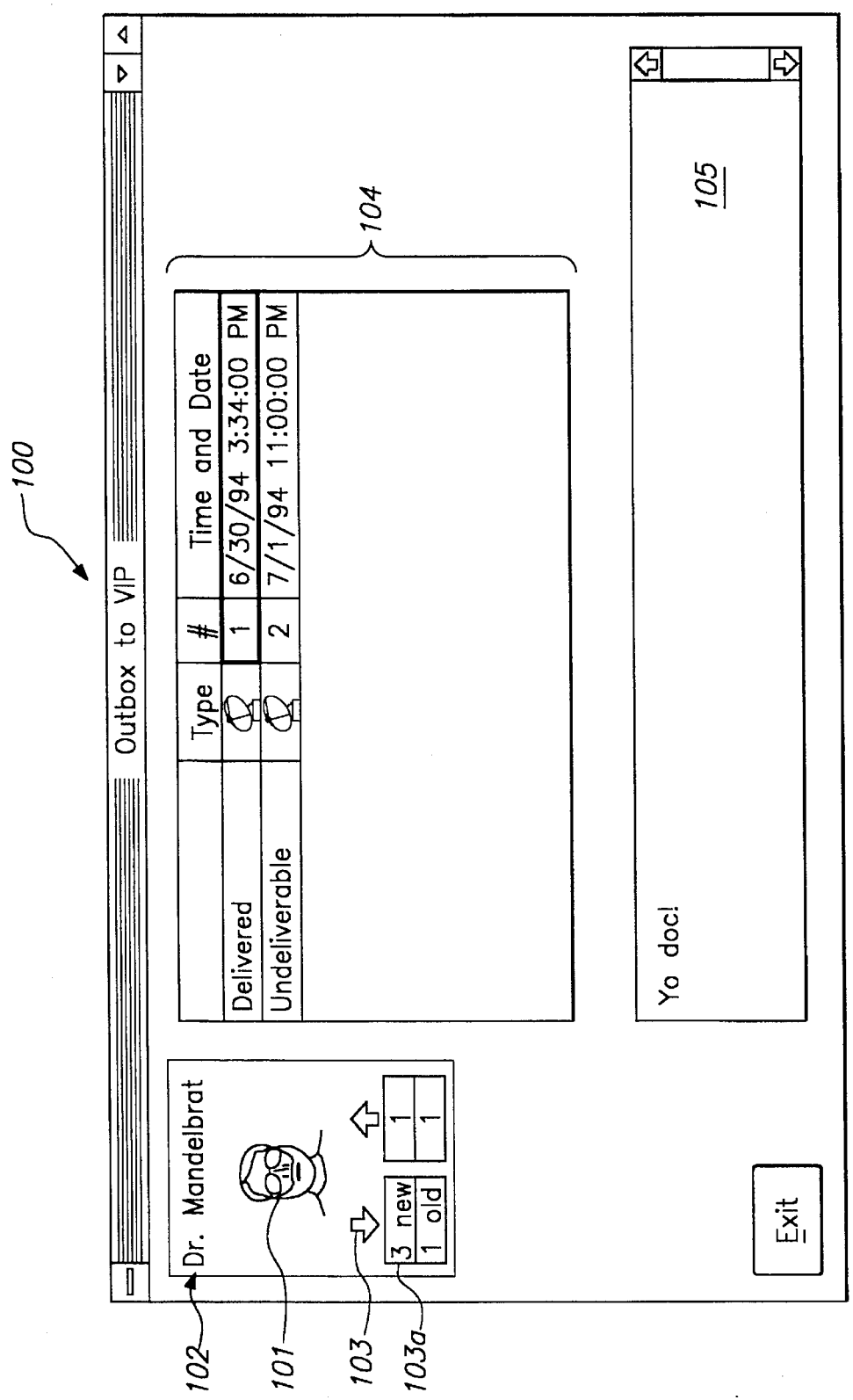

If, as described above, the subscriber operates upon the status indicator boxes corresponding to the upwardly facing directional icon, processor 21 loads and executes programmed instructions to move to block 35, represented by display 100, labelled "Outbox For VIP", shown in FIG. 9. Display 100 includes an image of the VIP member 101, his or her associated title or nickname 102, and directional icons 103 and status indicators 103a. Display 100 also includes outgoing message queue 104 and information window 105. Outgoing message queue 104 lists, preferably in chronological order, only those messages that are directed to the VIP member whose image 101 is displayed.

Each message has its own line of information fields which include whether or not the message has been delivered; the type of message; the message number in the queue; and the date and time the message was sent. The type of message is indicated as for incoming messages (for example, by an antenna for a wireless message, a telephone console to represent a voice mail message, and a facsimile machine to represent a facsimile message).

Information window 105 displays the text of a message if that file is selected using pointing device 24 of apparatus 20. If, for example, the message is a wireless e-mail message, the contents of message will be displayed in information window 105 when the cursor is positioned upon and selects that message (shown as reverse video for that entry in queue 104). Controls also are provided for scrolling through the text of the message.

Referring once again to FIGS. 2 and 3, operation of the features of Functional gallery 32 and lower portion 51 of main display 45 of the present invention are described with reference to FIGS. 10–14. A subscriber activates the features of the Functional gallery 51 by positioning the cursor on one of command boxes 51a–e using pointing device 24 and actuating the command key or by typing the underscored letter command for command boxes 51a–e using keyboard 23.

The subscriber moves to the "New Messages" display by either operating on command box 51a or typing the letter "N". Processor 21 then moves to block 41 by loading and executing programmed instructions to display "New Messages" display 110, illustrated in FIG. 10. Display 110 presents incoming message queue 111 and information window 112. Each message in incoming message queue 111 has its own line of information fields which include the type of message; the message number in the queue; the originator of the message; the date and time the message was received; the length of the message; and the status of the message (i.e., whether it experienced any transmission errors). The type of message is indicated using icons as described hereinabove. Information window 112 displays either the text of the message or the path and filename for the message as described hereinabove with respect to FIGS. 6–8. Messages in queue 111 include not only those messages received from members of the VIP gallery, but also all other individuals sending messages to the subscriber.

The subscriber likewise accesses the functions available from blocks 37–39 of diagram 30 in a similar fashion as described above for block 41. In particular, the subscriber may operate upon command boxes 51b, 51c or 51d to command processor 21 to bring up either "Wireless Mail" display 120, "Voice Mail" display 130, or "Fax Mail" display 140.

Figure 11:
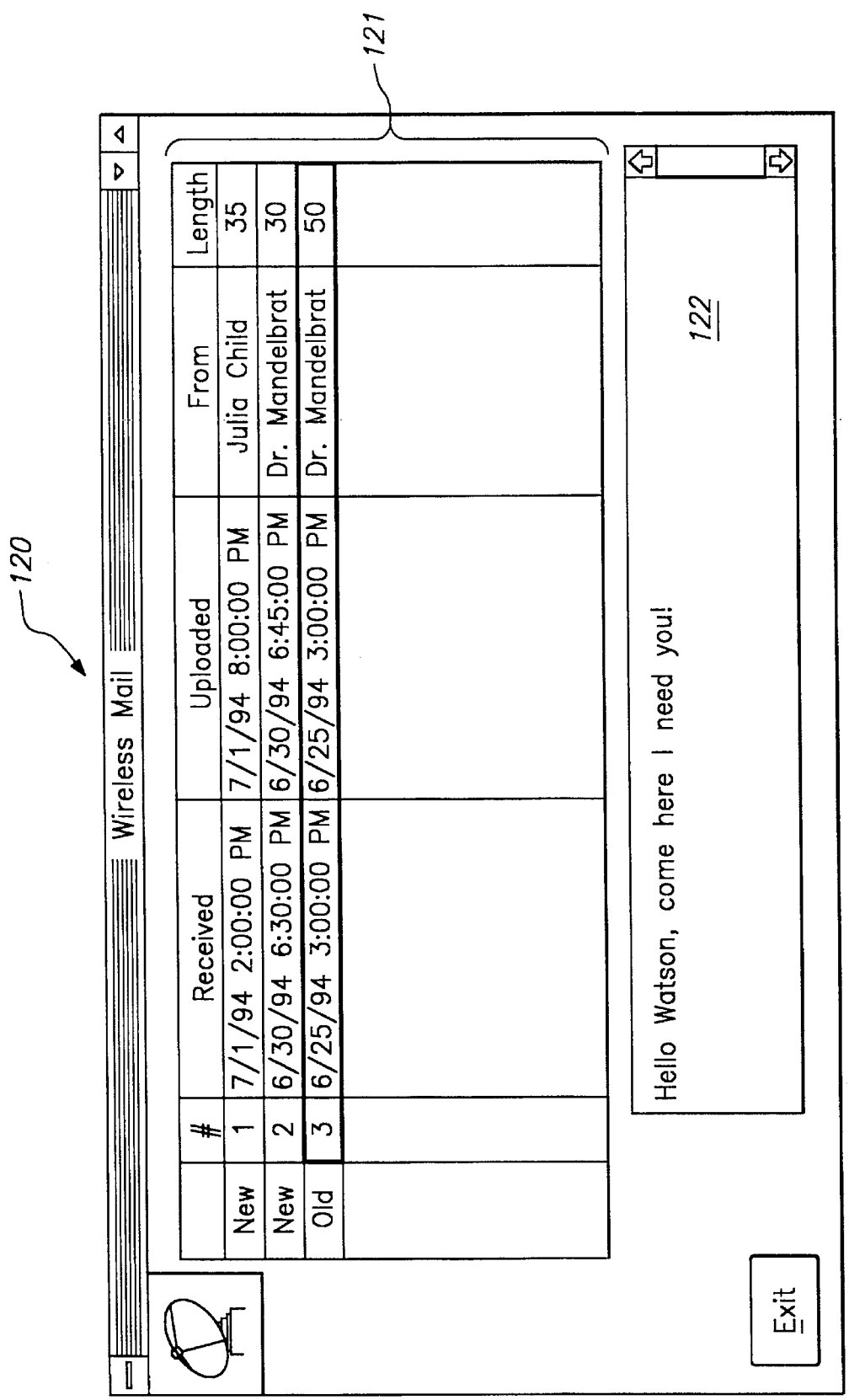

As shown in FIG. 11, if the subscriber brings up "Wireless Mail" display 120, incoming message queue 121 and information window 122 are presented. Incoming message queue displays all wirelessly received messages, preferably in reverse chronological order (for both new and old messages) and irrespective of the message originator. In particular, for each message in incoming message queue 121, information fields are provided which include the status of the message (i.e., whether NEW or OLD); the message number in the queue; when the message was received; when the message was uploaded; the originator of the message; and the length of the message. The text of the messages may be selected for display in information window 122 as described above with respect to FIGS. 6 and 10.

Figure 12:
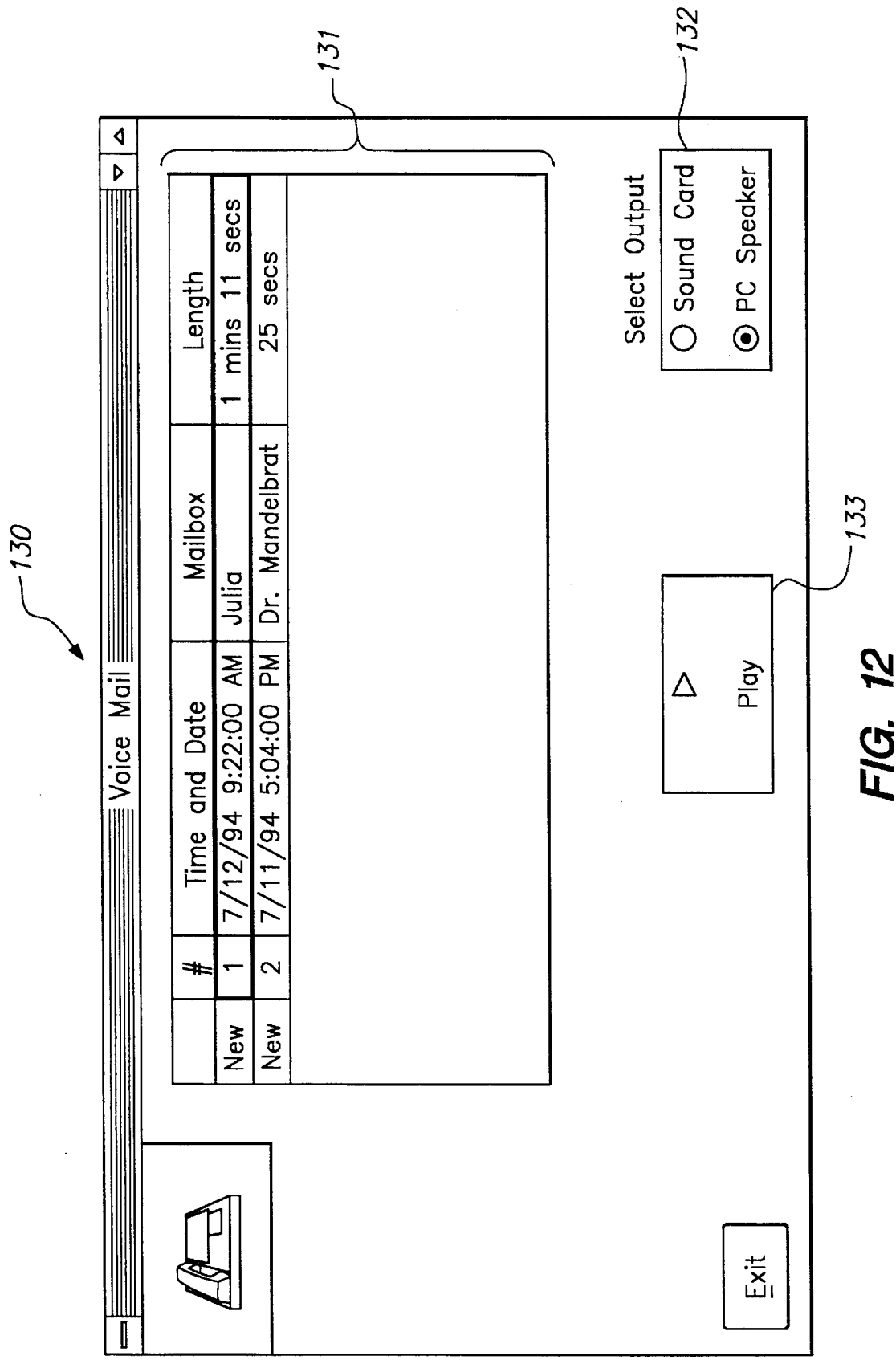
Figure 13:
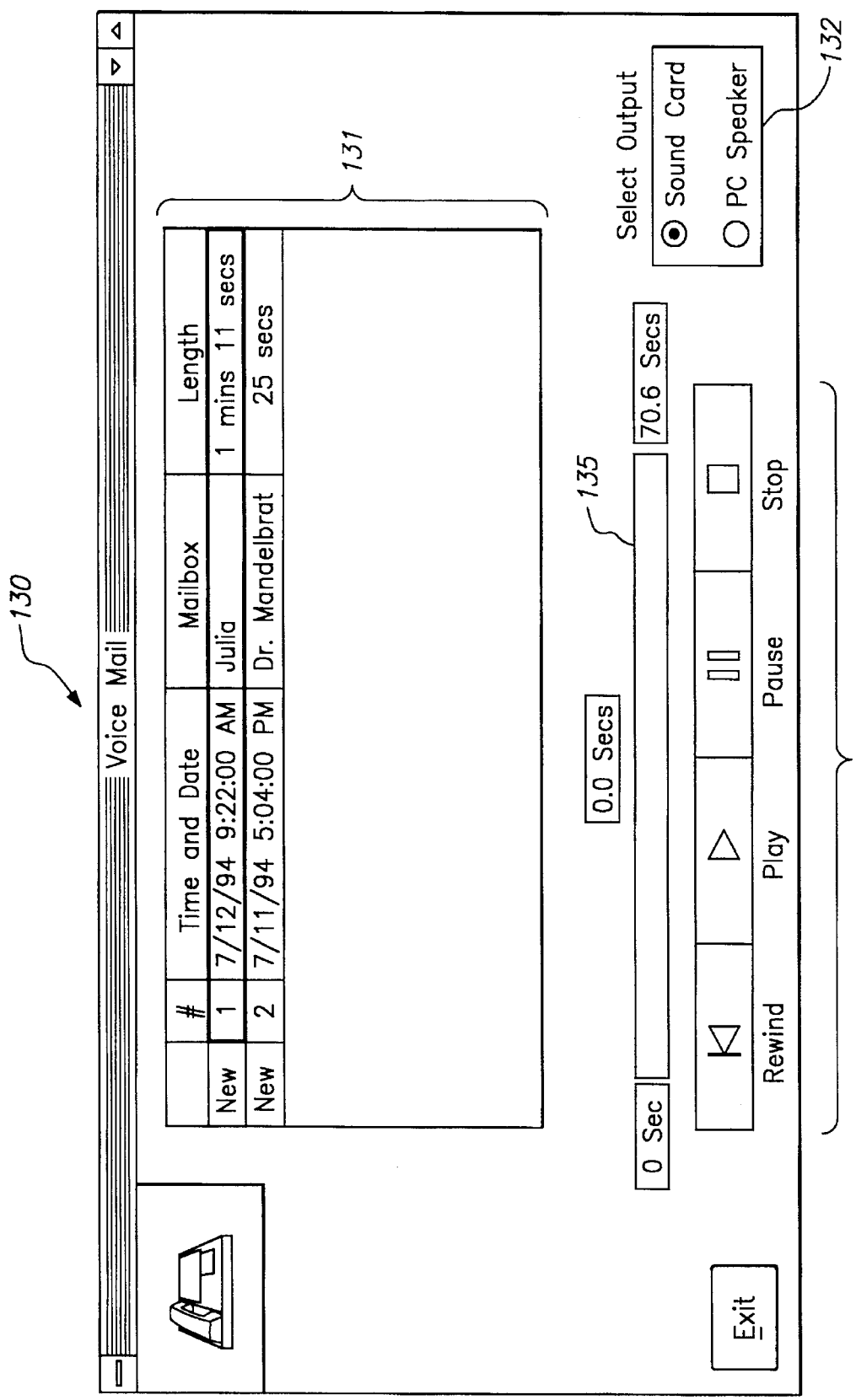

"Voice Mail" display 130, shown in FIGS. 12 and 13, displays queue 131 of incoming voice mail messages, preferably in reverse chronological order, and command boxes 132 and 133. Incoming voice mail queue 131 presents for each message information fields that include: the status of the message (i.e., whether NEW or OLD); the message number in the queue; the date and time received; the mailbox in which the message is stored; and the length of the message. Command box 132 enables the subscriber to select the output for the audio message, either the internal speaker or an optionally added sound card. Command box 133 permits the subscriber to commence playing a message by highlighting a message in queue 131 and then actuating pointing device 24.

Once the play command box is activated, it is replaced by audio command boxes 134 and duration counter 135 as shown in FIG. 13. Audio command boxes 134 enable the subscriber to play, rewind, pause and stop playback of the voice message, while message duration counter 135 provides both analog and digital readouts of the message length and the subscriber's present location in the message.

Figure 14:
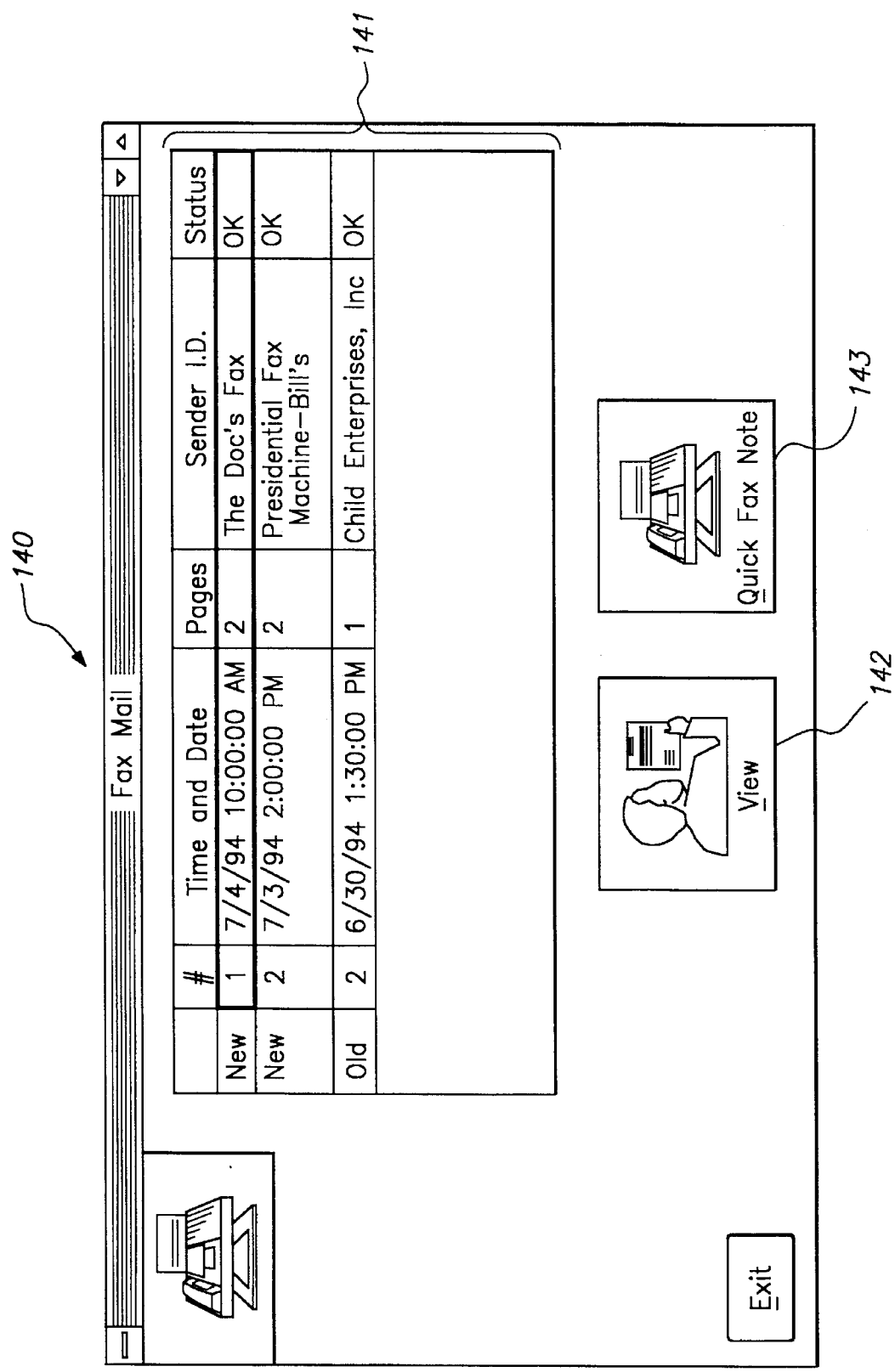

"Fax Mail" display 140, shown in FIG. 14, displays queue 141 of incoming facsimile messages, preferably in reverse chronological order, and command boxes 142 and 143. Incoming facsimile message queue 141 presents for each message information fields that include: the status of the message (i.e., whether NEW or OLD); the message number in the queue; the date and time received; the number of pages in the message; the sender's identification; and the status of the message with respect to transmission errors. Command box 142 enables the subscriber to select a facsimile message for viewing by highlighting that message (in reverse video) in the queue and then actuating the VIEW command box, 142. Command box 143 provides the subscriber with a window (not shown) within which to compose and send a reply facsimile.

Command box 51e of portion 51 of Functional gallery 51 (see FIG. 3) permits the subscriber to set apparatus 20 to operate in a telephone answering/voice mail mode, as described hereinabove. Main display 45 of the present invention may be readily extended to include a command box enabling the subscriber to record a greeting for use in telephone answering.

Figure 15:
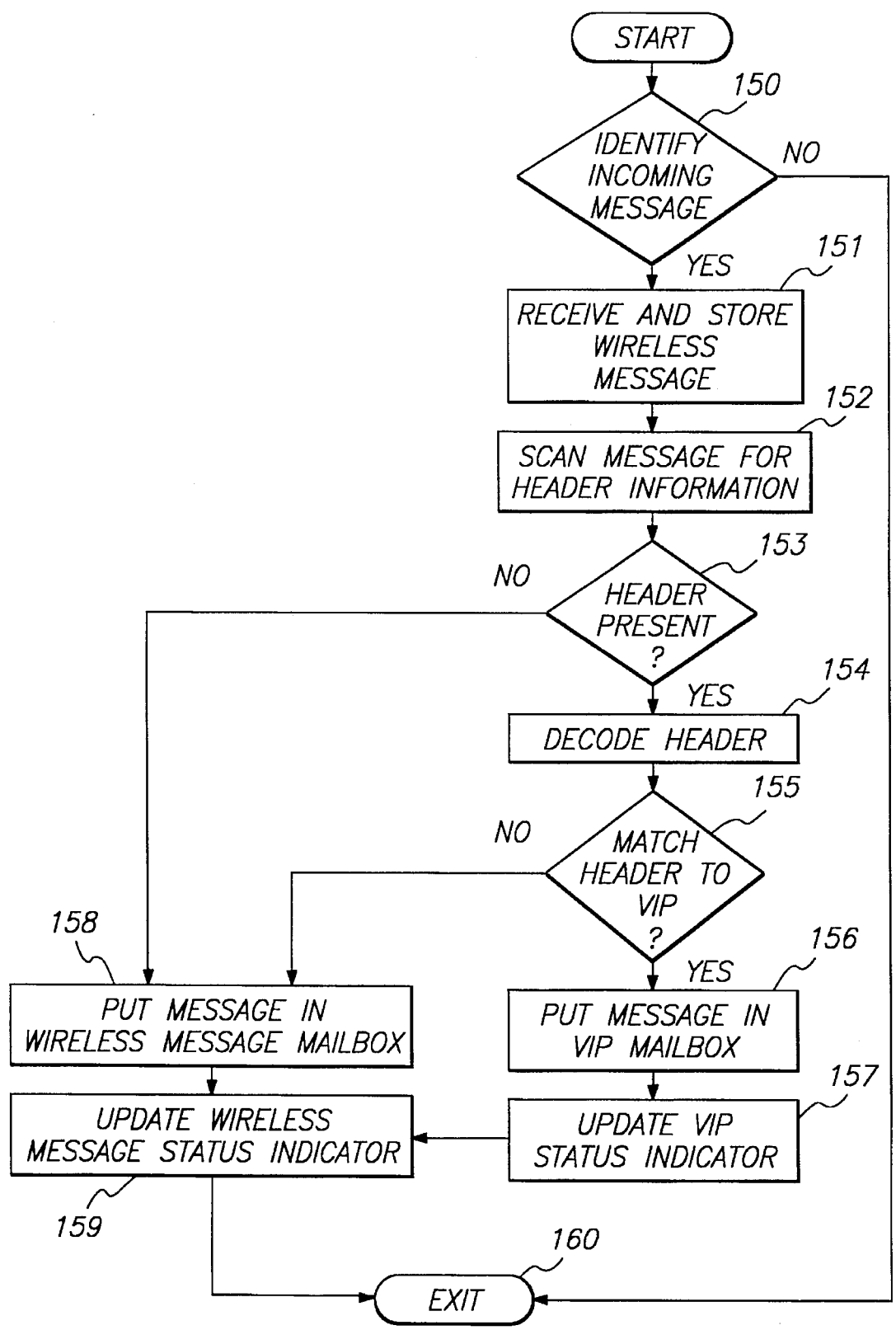
FIGS. 15–19 are flow diagrams illustrating the methods of segregating incoming communications in accordance with the present invention.

Referring now to FIGS. 15–19, methods of discriminating between the types and originators of incoming messages are described. In particular, VIP gallery 31 and functional gallery 32 in accordance with the present invention require that apparatus 20 be able to discriminate the type of communications medium employed for each message received and the originator of the communication (i.e., either a member of the VIP gallery or someone else). FIG. 15 presents a flow chart of a method of discriminating and classifying an incoming wireless message according to originator, while FIGS. 16–19 provide similar flow charts for incoming voice mail and facsimile communications.

As shown in FIG. 15, communications device 26 of apparatus 20 periodically monitors for incoming wireless messages at decision box 150. If no incoming message is detected, control passes to box 160 and no action is taken. If instead an incoming message is detected at box 150, the incoming message is received and temporarily stored by communications device 26, and then passed to processor 21.

It is conventional for the text of pager and wireless e-mail messages to have a header that includes the originator of the message. Thus, for example, the header may include a sequence number, followed by the sender's name, followed by the text of the message. The method of this aspect of the present invention assumes that a header containing the above information is available. At box 152 of FIG. 15, processor 21 executes programmed instructions to scan for the presence of this header information.

If no header is present (or the header format is not a recognized format), control passes to box 158, where the message is stored in the subscriber's general mailbox. The status indicator for the "New Messages" command box 51a and "Wireless Mail" command box 51b (see FIG. 3) are then updated at box 159 and control passes to exit box 160.

If a header is present on the message and is in a recognized format, processor 21 decodes the header at box 154. The decoded header information, preferably the sender's name, is then compared to the information for the members of VIP gallery 50 to determine whether there is a match at decision box 155. If there is no match between the decoded header information and any of the VIP gallery members, control passes to box 158 as described above.

If there is a match between the decoded header information and a member of the VIP gallery, the incoming wireless message is stored in the mailbox for that VIP (at box 156) and the status indicator 50d for that member of the VIP gallery is updated (at box 157). Because functional gallery 51 also reflects new messages received from VIP gallery members as well as all others, control then passes from box 157 to box 159 where the command boxes for "New Messages" and "Wireless Mail" are also updated before control passes to exit box 160.

Figure 16:
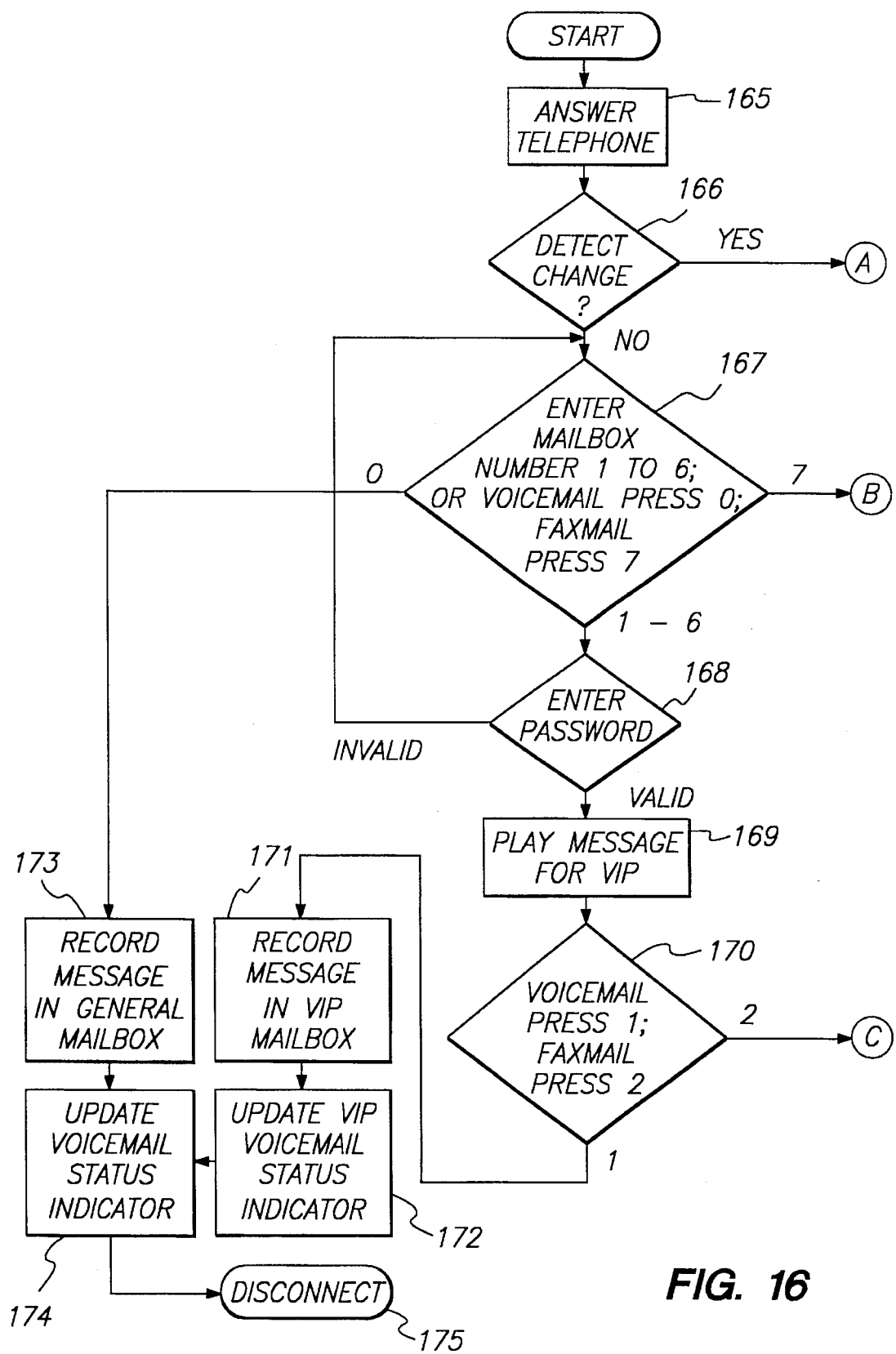

Referring now to FIG. 16, the method of discriminating and classifying incoming wireline calls as, for example, either a voice message or facsimile message, and whether the originator is a member of the VIP group is described. When command box 51e of main display 45 (see FIG. 3) is actuated, apparatus 20 enters a telephone answering mode of operation, in which it answers telephone line 27 connected to communications device 26.

As shown in FIG. 16, if apparatus 20 detects a ringing signal on telephone line 27, apparatus 20 goes off-hook at box 165. Processor 21 then monitors line 27 to detect CNG tones, conventionally transmitted by facsimile machines, at decision box 166. If CNG tones are detected, the processor assumes that the incoming message is a facsimile message and takes branch A to the flow chart of FIG. 17.

If no CNG tones are detected, processor 21 plays out a menu of options at box 167. The prompt (i.e., message played out to the caller) at box 167 requests that the caller enter a mailbox number by pressing the appropriate key on the caller's telephone, preferably 1 to 6 for the illustrative embodiment described with respect to FIG. 3. Additionally, the prompt tells the caller to press the "0" key to leave a voice message, or press the "7" key to leave a facsimile message. Software suitable for providing menus for implementing the methods of the present invention includes, for example, "SuperVoice," available from Pacific Image Communications, Alhambra, Calif.

If in response to the menu the caller presses the 1, 2, 3, 4, 5 or 6 key, control passes to decision box 168, where the caller is prompted to enter an optional password, preferably assigned to the respective VIP mailbox number. The validity of the password is checked at decision box 168. If the password is invalid, control returns to decision box 167, where the menu is replayed to the caller to permit an alternative selection. If the password is valid, control passes to box 169, where a message recorded by the subscriber for that particular VIP member may be played out. Thus, for example, if the subscriber desires to answer a question posed by the caller in an earlier communication, the subscriber may pre-record a message for a particular VIP in that VIP's Mailbox, so that the caller may later call into apparatus 20 to retrieve the message, even in the subscriber's absence.

Figure 17:
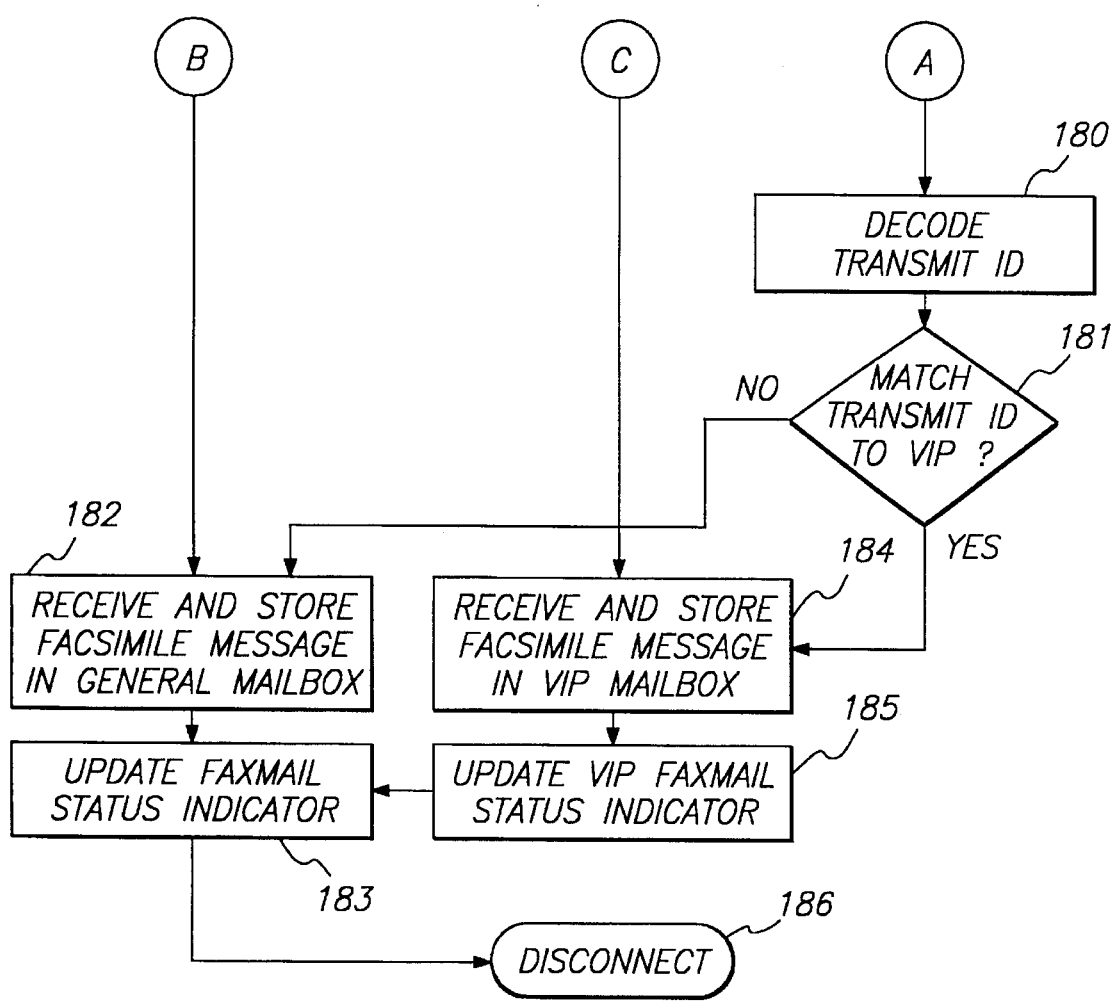

If at box 167 the caller presses the "7" key, control is transferred to branch B of the flow chart of FIG. 17. Also, if the caller presses the "0" key at box 167, control passes to box 173 and the caller is prompted to leave a voice message which is then recorded and stored in the subscriber's general mailbox rather than a particular VIP member's mailbox. Apparatus 20 then updates the "New Messages" and "Voice Mail" command boxes 51a and 51d (see FIG. 3) at box 174 of the flow chart of FIG. 16. Apparatus 20 then monitors for a disconnect tone and goes on-hook at box 175.

Returning again to box 169, once the optional message for the caller is played out, control passes to decision box 170. At box 170 the caller is prompted to press the "1" on his or her telephone set if he or she desires to leave a voicemail, and to press the "2" key if he or she desires to send a facsimile message. If the caller presses the "2" key at box 170, control passes to branch C of the flow chart of FIG. 17.

If, on the other hand, the caller presses the "1" key at decision box 170, control passes to box 171. At box 171 the caller is prompted to record a voice message for the subscriber. Apparatus 20 then records a message for the subscriber from the caller and stores it in that VIP member's mailbox. The status indicator 50d for that member of VIP gallery 50 is then updated at box 172, and the "New Messages" and "Voice Mail" command boxes 51a and 51d are also updated at box 174. Apparatus 20 then monitors for a disconnect tone and goes on-hook at box 175.

Referring now to FIGS. 16 and 17, classification of facsimile messages by originator is described. If at box 166 of FIG. 16 apparatus 20 detects CNG tones on telephone line 27, control passes along branch A to box 180 of FIG. 17. At box 180, apparatus 20 decodes the "TRANSMIT ID" information that conventionally precedes the text of a facsimile image. The decoded TRANSMIT ID information is the compared at box 181 to the communications parameters stored for members of the VIP gallery (e.g., the facsimile telephone number or incoming FAX ID information shown in the display of FIG. 5) to determine whether there is a match.

If there is a match of the TRANSMIT ID data at box 181, control passes to box 184, where the incoming facsimile message is received and stored in the VIP mailbox corresponding to the matched VIP data. Apparatus 20 then updates status indicator 50d (see FIG. 3) for that member of the VIP gallery at box 185, updates the "Fax Mail" command box 51c (see FIG. 3) at box 183, and then goes on-hook at box 186.

If there is no match at box 181 for the decoded TRANSMIT ID data, control passes to box 182, where the incoming facsimile message is stored in the subscriber's general mailbox. Apparatus 20 then updates the "Fax Mail" command box 51c (see FIG. 3) at box 183, and goes on-hook at box 186. If the caller presses the "7" key in response to the menu of options at decision box 167, control is passed along branch B of FIGS. 16 and 17 to box 182, where the call is further handled as just described above.

If the caller presses the "2" key of his or her telephone at box 170, control passes along branch C to box 184 of the flow chart of FIG. 17. The incoming facsimile message is then received and stored in the VIP member's mailbox whose mailbox number was entered at decision box 167. As described above for the case where the decoded TRANSMIT ID data is matched to a VIP gallery member, apparatus 20 then updates status indicator 50d for that member of the VIP gallery at box 185, updates the "Fax Mail" command box 51c at box 183, and goes on-hook at box 186.

As will be understood by one skilled in the art, apparatus 20 therefore discriminates between wireless messages and wireline messages according to whether the message is received from the wireless portion of communication device 26 or over telephone line 27. Further, whether an incoming message originated from a member of the VIP gallery or someone else may be determined by decoding the header information included with the wireless message.

For wireline messages, the type of communications medium (i.e., either voice or facsimile) is determined by user input, as is also the determination whether the message sender is a member of the VIP gallery or someone else. Finally, apparatus constructed in accordance with the present invention may include the capability to decode the TRANSMIT ID information associated with a facsimile message, and use that information to classify the message as originating from a member of the VIP gallery.

Figure 18:
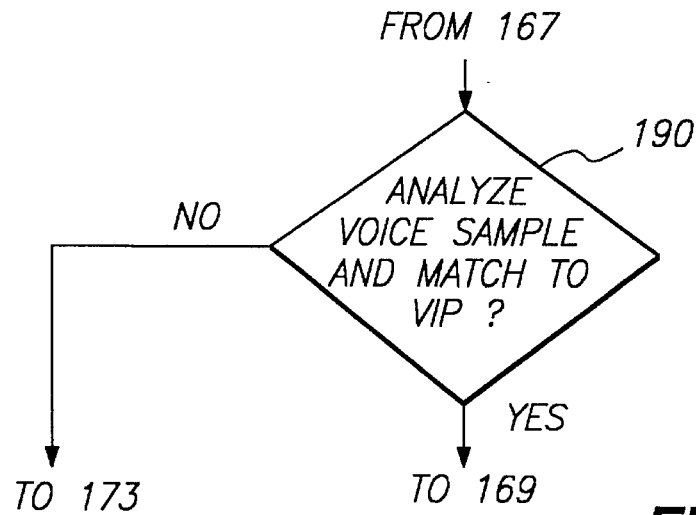
Figure 19:
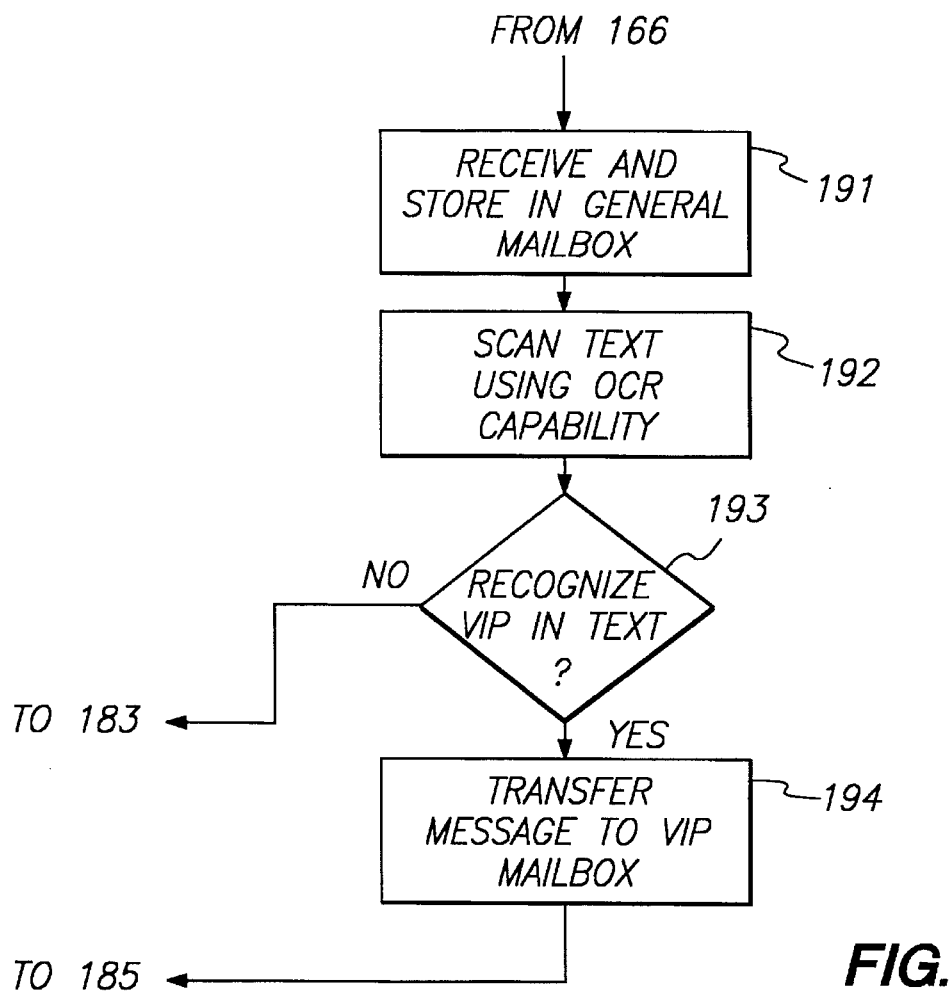

Referring to FIGS. 18 and 19, certain enhancements to the illustrative methods of FIGS. 16–17 are described. In particular, FIG. 18 illustrates a method of classifying a voice message as a VIP member by sampling the caller's voice signal and analyzing that signal to determine whether it matches a stored sample of that caller's voice associated with a VIP mailbox. This enhancement eliminates the most of the menu prompts at decision box 167 and also eliminates the need for an optional password at decision box 168.

FIG. 19 shows a further enhancement to the ability of apparatus 20 to classify an incoming facsimile message along branch A from decision box 166. In particular, an incoming facsimile message along branch 166 may first be stored in the subscriber's general mailbox, box 191. The stored message may then be scanned using optical character recognition technology, box 192, to determine whether any of the VIP member's names or other designations appear in the text of the facsimile message, box 193. If a match is made at box 193, the message may then be transferred to the appropriate VIP member's mailbox, at box 194; otherwise the message may be left in the subscriber's general mailbox. In either case, the appropriate status indicators and/or command boxes are then preferably updated, at boxes 183 and 185.

Referring again to FIG. 3, a further enhancement to the apparatus and methods of the present invention may be to include a "Help" command box (not shown) in functional gallery 51, and in other of the displays of FIGS. 4–14, as desired. In this enhancement, the subscriber first positions the cursor on the Help command box using pointing device 24. Operating upon the command box causes processor 21 to load and execute instructions that "freeze" the other icons and command boxes in that display. The subscriber may then reposition the cursor elsewhere in the display using pointing device 24.

Now, however, when the subscriber operates the pointing device upon a command box (other than the Help command box), an inset display providing information related to that icon or command box is displayed to the subscriber, and the function performed by that icon or command box is not performed. After reading the information in the inset display box, the subscriber may then return to and actuate the Help command box to restore normal functioning of the display.

As will be appreciated by those skilled in the art, the foregoing enhancement enables the apparatus and methods of the present invention, as implemented in apparatus 20, to be self-documenting, thus providing the subscriber with real-time assistance and reducing reliance upon manuals or other documentation. In addition, the Help command box enables the subscriber to conveniently toggle between an active state, in which apparatus 20 may be commanded to execute particular functions associated with the display icons and command boxes, and a static state, wherein helpful information about any particular function may be displayed.

A yet further enhancement to the apparatus and methods of the present invention, as implemented in apparatus 20, is to provide an "Instant Feedback" box (not shown) that appears in a display, for example, once the "Help" command box has been activated. This "Instant Feedback" command box enables the subscriber to direct a question or comment concerning the product to the manufacturer, for example, the assignee of the present invention.

In particular, when the "Instant Feedback" box is operated upon with pointing device 24 or keyboard 23, an information box is provided in which the subscriber may report a problem or suggest a further enhancement to the manufacturer. Preferably, communication device 26 of apparatus 20 is capable of originating both wireless e-mail and facsimile messages. The "Instant Feedback" feature of the present invention employs this capability to direct an e-mail message to the manufacturer's network address, or send a facsimile message to the manufacturer's facsimile machine, preferably automatically, when the subscriber completes composing his or her message.

Accordingly, this last described aspect of the system and method of the present invention enables a subscriber to communicate problems or suggestions to the manufacturer (i.e., assignee of the present invention) with a minimum of delay and effort.

Other modifications and additions to make the present invention even more ergonomic and intuitive will be apparent to those skilled in the art based upon the foregoing disclosure. The foregoing embodiments are merely illustrative of the principles of this invention, and therefore various modifications can be made by those skilled in the art without departing from the scope and spirit of the invention.

The invention claimed is:

1. A method of displaying information pertaining to communications between a user and members in a selected group, the method comprising a series of steps of:

displaying a gallery including a plurality of images, each one of the plurality of images corresponding to a member in the selected group, each one of the plurality of images having a status indicator and an associated message directional icon, the status indicator representing a current status of messages of a type represented by the associated message directional icon;

monitoring communications between the user and a selected member in the selected group to determine a current status of messages of the type represented by the associated message directional icon; and updating the status indicator displayed in the gallery for the one of the plurality of images corresponding to the selected member in the selected group.

2. A method of displaying information as defined in claim 1 further comprising a step of:

selectively operating upon a selected one of the plurality of images in the gallery to cause display of communications attributes pertaining to a member in the selected group corresponding to the selected one of the plurality of images; and editing the communications attributes pertaining to the member in the selected group corresponding to the selected one of the plurality of images.

3. A method of displaying information as defined in claim 1 further comprising a step of:

selectively operating upon the status indicator corresponding to a selected one of the plurality of images in the gallery to cause display, only for the member in the selected group corresponding to the selected one of the plurality of images, of information pertaining to messages of a type represented by the associated message directional icon.

4. A method of displaying information as defined in claim 3 wherein the information pertains to voice, facsimile or wireless communications between the user and the member in the selected group.

5. A method of displaying information as defined in claim 4 wherein the information comprises a queue of messages, the queue including an indicator identifying each one of the messages as being a voice communication, a facsimile communication or a wireless communication.

6. A method of displaying information as defined in claim 5 further comprising a step of:

displaying a message if the indicator identifies the message as a wireless communication.

7. A method of displaying information as defined in claim 5 further comprising a step of:

listening to a message if the indicator identifies the message as a voice communication.

8. A method of displaying information as defined in claim 5 further comprising a step of:

printing out a message if the indicator identifies the message as a facsimile communication.

9. A method of displaying information as defined in claim 4 further comprising a series of steps of:

displaying a second plurality of images, each one of the second plurality of images corresponding to a type of communications medium, each one of the second plurality of images having a status indicator representing a current status of incoming messages of that type;

monitoring communications received by the user to determine a current status of incoming messages for each type of communications medium; and updating the status indicator displayed in the plurality of images for each type of communications medium.

10. A method of displaying information as defined in claim 9 further comprising a step of:

selectively operating upon a selected one of the second plurality of images to cause display, only for the type of communications medium corresponding to the selected one of the second plurality of images, of information pertaining to incoming messages received by the user.

11. A method of displaying information as defined in claim 1 wherein the associated message directional icon represents incoming messages and the step of monitoring communications between the user and a selected member in the selected group further comprises steps of:

receiving an incoming message from a sender; and discriminating the sender as being the selected member of the selected group.

12. A method of displaying information as defined in claim 11 wherein the incoming message includes a header storing data pertaining to the identity of the sender and the step of discriminating the sender as being the selected member of the selected group further comprises steps of:

scanning the header to extract the data pertaining to the identity of the sender;

comparing the data pertaining to the identity of the sender to a predetermined communications attribute associated with each member of the selected group; and updating the status indicator displayed in the gallery for the one of the plurality of images corresponding to the selected member in the selected group only if the data pertaining to the identity of the sender matches the predetermined communications attribute associated with the selected member of the selected group.

13. A method of displaying information as defined in claim 11 wherein the step of discriminating the sender as being the selected member of the selected group further comprises steps of:

receiving data input by the sender that identifies the sender as the selected member of the selected group.

14. The method of displaying information as defined in claim 1 further comprising a series of steps of:

providing an icon associated with a self-documenting feature;

selectively operating upon the icon to move between a first state wherein each one of the plurality of images may be selectively operated upon to cause a function associated with each one of the plurality of images to be performed, and a second state wherein operating upon a selected one of the plurality of images causes display of information pertaining to the functioning of that selected one of the plurality of images, but does not cause the function associated with that selected one of the plurality of images to be performed.

15. The method of displaying information as defined in claim 1 further comprising a series of steps of:

providing an icon associated with a problem reporting feature;

selectively operating upon the icon to cause display of an information box in which the user may compose a message to a predetermined recipient; and automatically sending the message to the predetermined recipient upon completion of the message.

16. Apparatus for communicating with members in a selected group by a plurality of communications media, the apparatus comprising:

a processor for receiving incoming messages and monitoring the incoming messages to generate signals indicative of a current status of the incoming messages;

data storage means coupled to the processor for storing incoming messages;

interface means for selectively coupling the processor to each one of the plurality of communications media;

a user interface having display means for displaying a gallery including a plurality of images, each one of the plurality of images corresponding to a member in the selected group, each one of the plurality of images having a status indicator representing a current status of incoming messages, from that member in the selected group, responsive to the signals indicative of the current status of the incoming messages.

17. The apparatus as defined in claim 16 wherein the processor receives for storage data pertaining to members in the selected group, the data storage means stores data pertaining to members in the selected group, and the user interface further comprises:

means for selectively operating upon a selected one of the plurality of images in the gallery to cause display of, and enable editing of, communications attributes pertaining to a member in the selected group corresponding to the selected one of the plurality of images.

18. The apparatus as defined in claim 16 wherein the user interface further comprises:

means for selectively operating upon the status indicator corresponding to a selected one of the plurality of images in the gallery to cause display, only for the member in the selected group corresponding to the selected one of the plurality of images, of information pertaining to incoming messages from that member.

19. The apparatus as defined in claim 16 wherein the plurality of communications media include voice communications, facsimile communications, and wireless communications.

20. The apparatus as defined in claim 19 wherein the processor generates for display on the user interface a queue of incoming messages for each member in the selected group, the queue including an indicator identifying each one of the incoming messages as being a voice communication, a facsimile communication or a wireless communication.

21. The apparatus as defined in claim 20 wherein the user interface further comprises:

means for selectively operating upon the queue to display on the display means an incoming message if the indicator identifies the incoming message as a wireless communication.

22. The apparatus as defined in claim 20 wherein the user interface further comprises:

means for selectively operating upon the queue to enable playback of an incoming message if the indicator identifies the incoming message as a voice communication.

23. The apparatus as defined in claim 20 wherein the user interface further comprises means for selectively operating upon the queue to enable printout of an incoming message if the indicator identifies the incoming message as a facsimile communication.

24. The apparatus as defined in claim 16 wherein the display means further comprises:

a display of a second plurality of images, each one of the second plurality of images corresponding to a type of communications medium, each one of the second plurality of images having a status indicator representing a current status of incoming messages of that type of communications medium, responsive to the signals indicative of the current status of the incoming messages.

25. The apparatus as defined in claim 24 wherein the user interface further comprises:

means for selectively operating upon a selected one of the second plurality of images to cause display, only for the type of communications medium corresponding to the selected one of the second plurality of images, of information pertaining to incoming messages.

26. The apparatus as defined in claim 16 wherein the processor generates signals indicative of a current status of an incoming message for a selected member of the selected group by receiving an incoming message from a sender and discriminates the sender as being the selected member of the selected group.

27. The apparatus as defined in claim 26 wherein the incoming message includes a header storing data pertaining to the identity of the sender, the data storage means stores a predetermined communications attribute associated with each member of the selected group and the processor discriminates the sender as being the selected member of the selected group by scanning the header to extract the data pertaining to the identity of the sender, compares the data pertaining to the identity of the sender to the predetermined communications attributes, and generates signals indicative of a current status of the incoming message only if the data pertaining to the identity of the sender matches the predetermined communications attribute associated with the selected member of the selected group.

28. The apparatus as defined in claim 26 wherein the apparatus discriminates the sender as being the selected member of the selected group by receiving data input by the sender that identifies the sender as the selected member of the selected group.

29. The apparatus as defined in claim 16 wherein the user interface means further comprises an icon associated with a self-documenting feature that may be selectively operated upon to move between a first state, wherein each one of the plurality of images may be selectively operated upon to cause a function associated with each one of the plurality of images to be performed, and a second state, wherein operating upon a selected one of the plurality of images causes display of information pertaining to the functioning of that selected one of the plurality of images, but does not cause the function associated with that selected one of the plurality of images to be performed.

30. The apparatus as defined in claim 16 wherein the user interface further comprises:

an icon associated with a problem reporting feature that may be selectively operated upon to cause display of an information box in which the user may compose a message to a predetermined recipient; and means for automatically sending the message to the predetermined recipient upon completion of the message.

\* \* \* \* \*